United States Patent [19]

Hideo et al.

[11] Patent Number: 4,800,980

[45] Date of Patent: Jan. 31, 1989

[54] BODY COVER AND TRUNK STRUCTURE FOR A MOTOR SCOOTER

[75] Inventors: Ochiai Hideo, Saitama; Kiyoshi Ohno, Tokyo; Eiichi Iwao, Saitama; Hideo Mori, Tokyo, all of Japan

[73] Assignee: Honda Giken Kogyo Kabushiki Kaisha, Tokyo, Japan

[21] Appl. No.: 915,624

[22] Filed: Oct. 6, 1986

[30] Foreign Application Priority Data

Oct. 5, 1985 [JP] Japan .................................. 60-222173
Mar. 24, 1986 [JP] Japan .............................. 61-42829[U]

[51] Int. Cl.⁴ .............................................. B60K 13/06
[52] U.S. Cl. ..................................... 180/225; 180/229;
180/89.2; 180/68.1; 296/37.16; 296/76;
296/208
[58] Field of Search ............... 180/225, 228, 229, 219,
180/89.1, 89.17, 89.2, 68.1, 215; 296/37.1,
37.16, 76, 78.1, 208

[56] References Cited

U.S. PATENT DOCUMENTS

| 2,225,914 | 12/1940 | Lewis et al. ........................ 180/219 |
| 3,776,353 | 12/1973 | Roth .................................... 180/215 |
| 3,779,597 | 12/1973 | Uchida ................................ 296/37 |
| 3,788,532 | 1/1974 | Bish ..................................... 224/31 |
| 3,882,951 | 5/1975 | Conley ........................... 180/68.1 X |
| 4,063,608 | 12/1977 | Sullivan ............................ 180/215 |
| 4,265,332 | 5/1981 | Presnall et al. ................ 180/68.1 X |
| 4,428,451 | 1/1984 | Yamaoka ....................... 180/68.1 X |
| 4,438,877 | 3/1984 | Jackson ............................. 224/275 |
| 4,441,574 | 4/1984 | Kohyama et al. ................... 180/219 |
| 4,519,473 | 5/1985 | Ochiai et al. .................... 180/68.1 X |
| 4,522,442 | 6/1985 | Takenaka ...................... 180/219 X |
| 4,577,719 | 3/1986 | Nomura et al. ..................... 180/219 |
| 4,579,190 | 4/1986 | Hashimoto et al. ................ 180/227 |
| 4,619,476 | 10/1986 | Kawasaki ........................... 296/37.1 |
| 4,633,965 | 1/1987 | Tsurumi et al. ............... 180/68.1 X |
| 4,666,009 | 5/1987 | Yashima et al. ................... 180/68.5 |
| 4,679,647 | 7/1987 | Komuro ............................. 180/219 |
| 4,721,178 | 1/1988 | Ito ..................................... 180/215 |

FOREIGN PATENT DOCUMENTS

| 513935 | 6/1955 | Canada ................................ 296/76 |
| 2532897 | 3/1984 | France . |
| 477708 | 2/1953 | Italy ................................... 180/229 |
| 60-154964 | 8/1985 | Japan . |
| 61-201987 | 12/1986 | Japan . |
| 800488 | 8/1958 | United Kingdom . |
| 819690 | 9/1959 | United Kingdom . |
| 1537233 | 12/1978 | United Kingdom ............... 180/229 |
| 2054477A | 2/1981 | United Kingdom . |

Primary Examiner—John J. Love
Assistant Examiner—Tamara L. Finlay
Attorney, Agent, or Firm—Lyon & Lyon

[57] ABSTRACT

A body cover for a motor scooter vehicle with a rear cover for covering the engine unit. The rear cover has a projection in its upper portion over the rear wheel, the projection having an outlet. Accordingly, the heat generated from the engine unit may be well discharged through the outlet of the projection to the atmosphere.

9 Claims, 14 Drawing Sheets

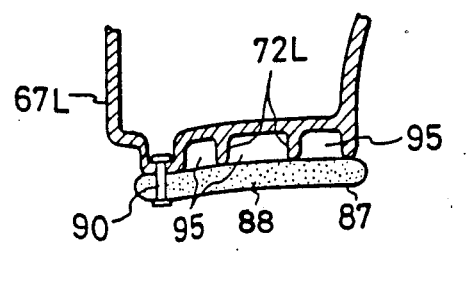 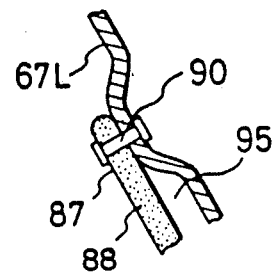
FIG. 12A. FIG. 12B.
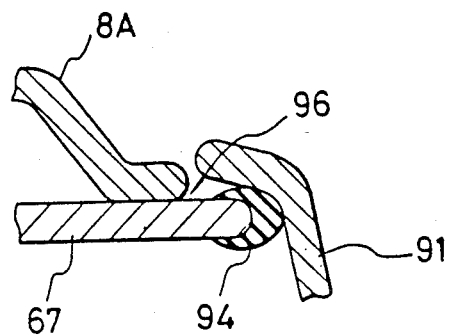
FIG. 13.

BODY COVER AND TRUNK STRUCTURE FOR A MOTOR SCOOTER

BACKGROUND OF THE INVENTION

The field of the present invention is body covers for a motor scooter type vehicle.

In the conventional motor scooter configuration, both the engine and the exhaust systems are arranged inside the body of the vehicle. The engine unit is covered by a body cover with a member such as the seat arranged on the upper surface of the body cover. Heat is discharged from the engine area through a louver formed in the body cover or a space between the seat and the body cover.

Recent motor scooter designs have incorporated an inner trunk within the rear body to accommodate a helmet or the like. Since there is limited space at the rear of the vehicle, the trunk must be arranged near both the muffler and the rear wheel.

Both the engine and muffler discharge heat to their surroundings. Existing motor scooter designs have difficulty in discharging the heat generated. Heat becomes trapped within the body cover particularly when the vehicle is stopped. The trunk becomes particularly susceptible to heat due to its close proximity to the muffler.

SUMMARY OF THE INVENTIONS

The present invention is directed to body covers for a motor scooter type vehicle which effectively discharge heat coming from the engine unit and the exhaust system. The body cover is comprised of a rear cover equipped with a projection in its upper portion. Heat, in the form of hot air, which cannot escape through customary side vents, rises to the top of the projection and is discharged through an outlet therein.

Insulation means may be provided between the engine unit and the seat and over the muffler.

Accordingly, it is an object of the present invention to provide a system for discharging engine heat out from a motor scooter body cover. Other and further objects and advantages will appear hereinafter.

BRIEF DESCRIPTION OF THE DRAWINGS

FIGS. 12A and 12B are sectional views taken along the lines II—II and III—III in FIG. 11, respectively;

FIG. 13 is an enlarged view of part of FIG. 8.

DETAILED DESCRIPTION OF THE PREFERRED EMBODIMENT

Figure 1:
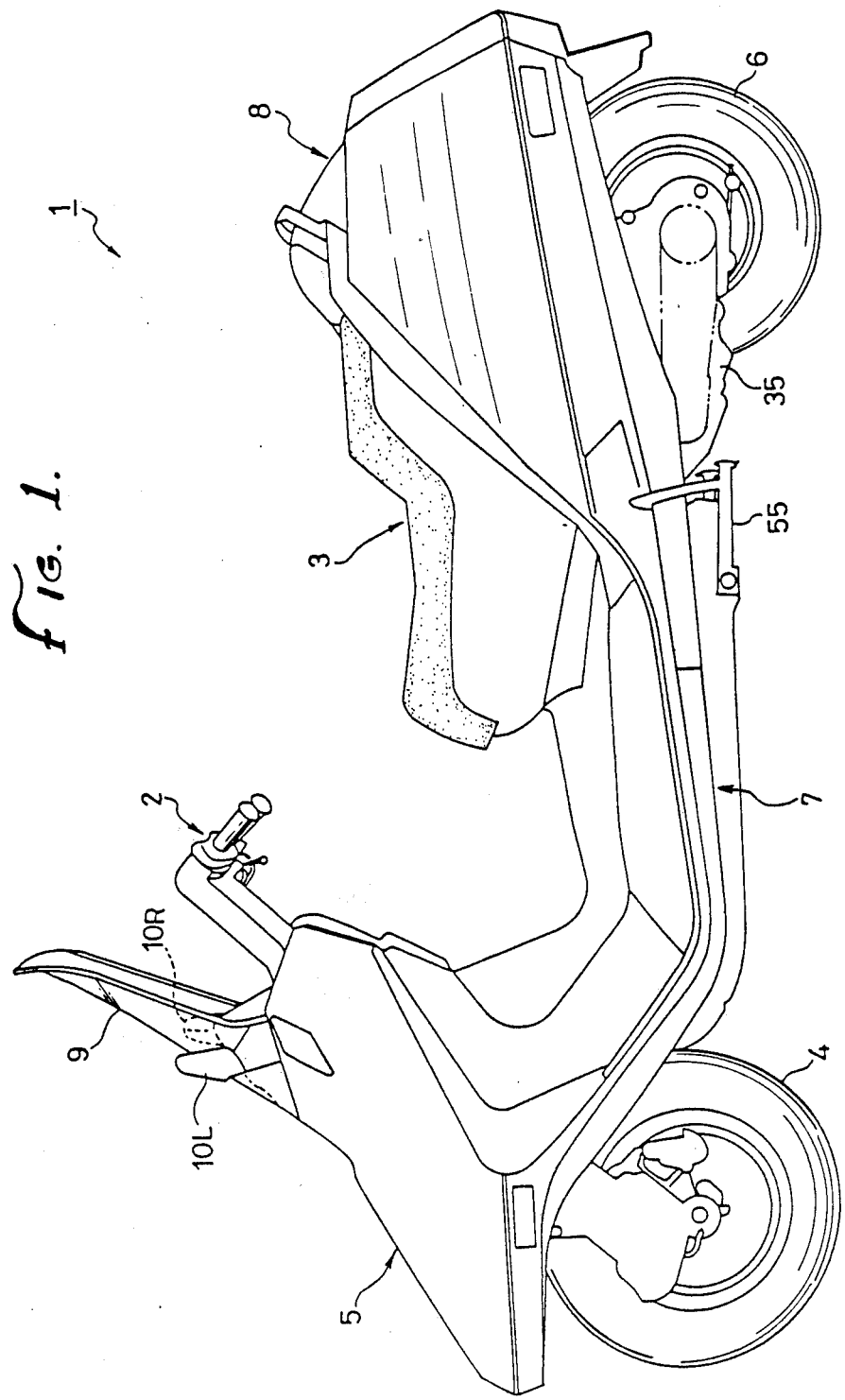
FIG. 1 is a side view of the scooter type vehicle according to the present invention.

Turning in detail to the drawings, FIG. 1 illustrates a motor scooter type vehicle 1 having a body structure of a so-called American type such that a handle 2 is provided at a high position, and a seat 3 is provided at a low position. A wheel base of the vehicle 1 is much longer than that of a conventional motorcycle. The seat 3 is of an integral type having a rider seat and a tandem seat, and is a so-called V-shaped seat having a substantially V-shaped structure. To accommodate the driver's legs, leg shield 5 having an angular configuration as viewed from a side perspective is provided over a front wheel 4. A low-slung step floor 7 is connected with the leg shield 5, and is arranged between the front wheel 4 and a rear wheel 6. A rear cover 8 is connected with the step floor 7, and covers an upper side of the rear wheel 6, which rear cover 8 has a slanted front edge extending along a rear edge of the V-shaped seat 3. Thus, a body cover is comprised of the leg shield 5, the step floor 7 and the rear cover 8. A windshield 9 is provided over the leg shield 5 on a front side of the handle 2, and side mirrors 10L and 10R are mounted to left and right sides of the windshield 9.

Figure 2:
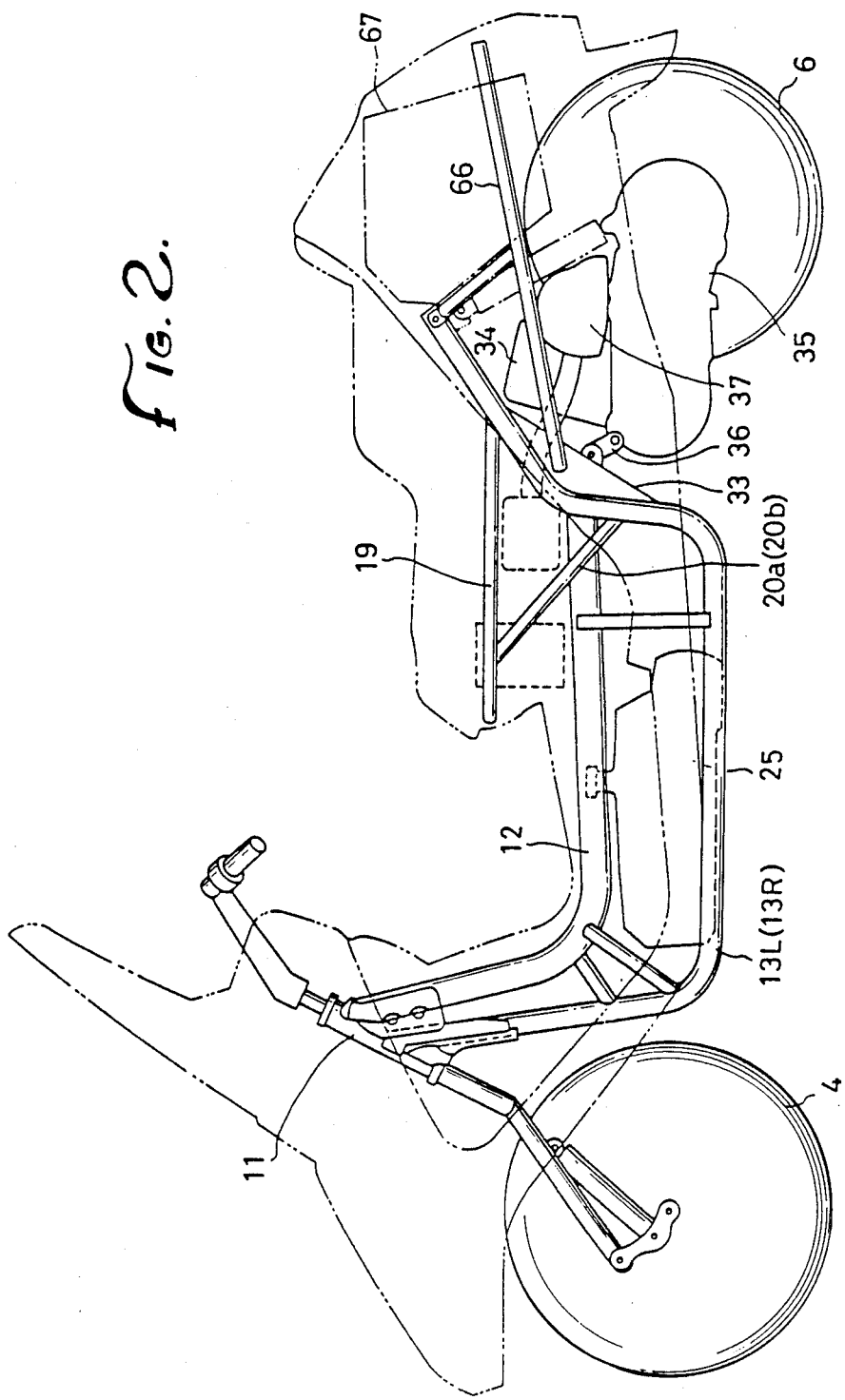
FIG. 2 is a side view of the frame structure in FIG. 1.
Figure 3:
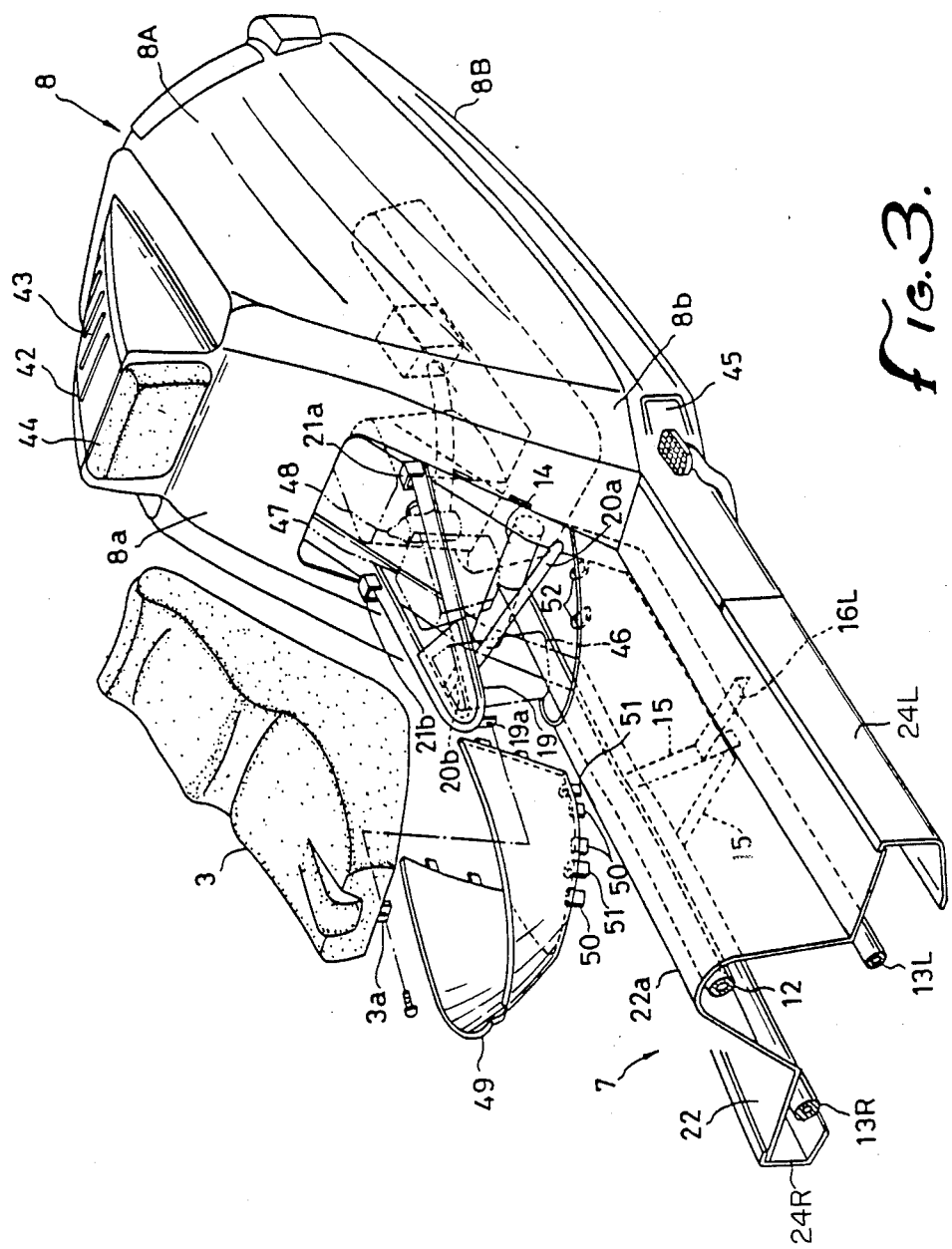
FIG. 3 is an exploded perspective view of the seat portion.
Figure 4:
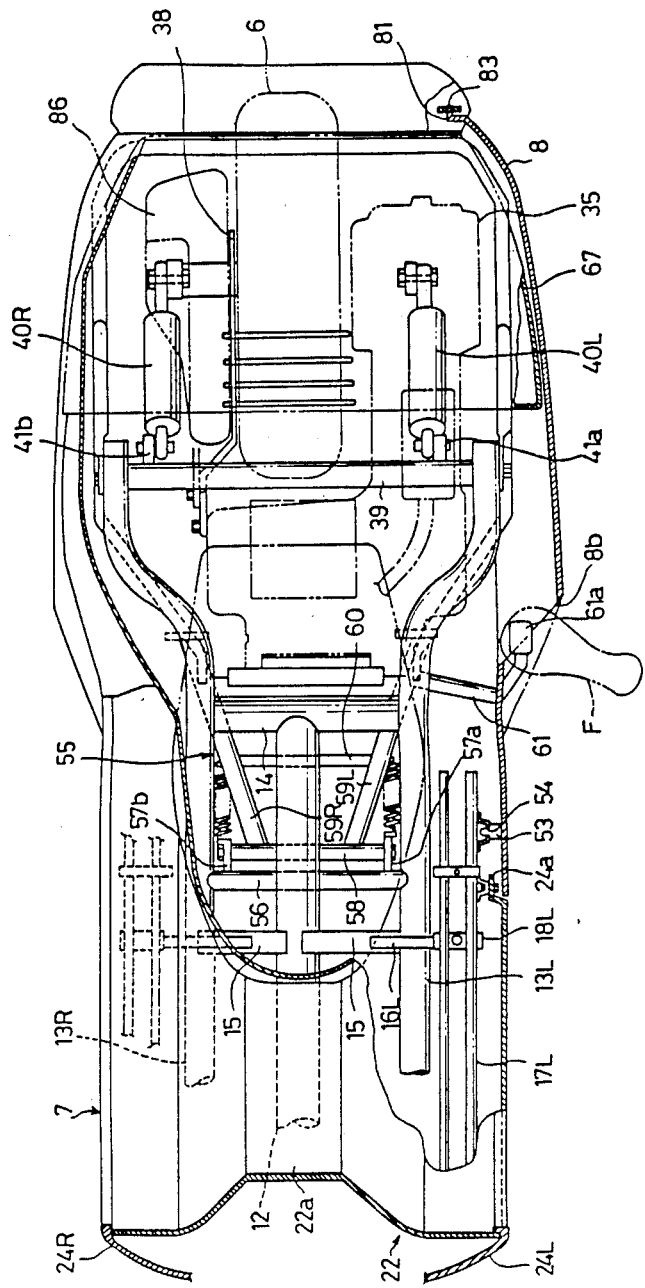
FIG. 4 is a broken plan view of the rear portion of the body.

Referring to FIG. 2, a body frame is comprised of a head pipe 11, a main pipe 12 and a pair of down pipes 13L and 13R. The main pipe 12 extends obliquely downwardly from the head pipe 11, and further extends horizontally from an upper rear side of the front wheel 4 to a rear portion of the body. The pair of down pipes 13L and 13R extend obliquely downward from the head pipe 11 to a position lower than the main pipe 12, and further extend in parallel to each other to the rear portion of the body, at which rear portion the down pipes 13L and 13R rise substantially upright, and further extend obliquely upward to a further rear portion of the body. As shown in FIGS. 3 and 4, a cross member 14 is fixed between both the upright rising portions of the down pipes 13L and 13R, and is connected at its intermediate portion to the rear end of the main pipe 12.

Figure 5:
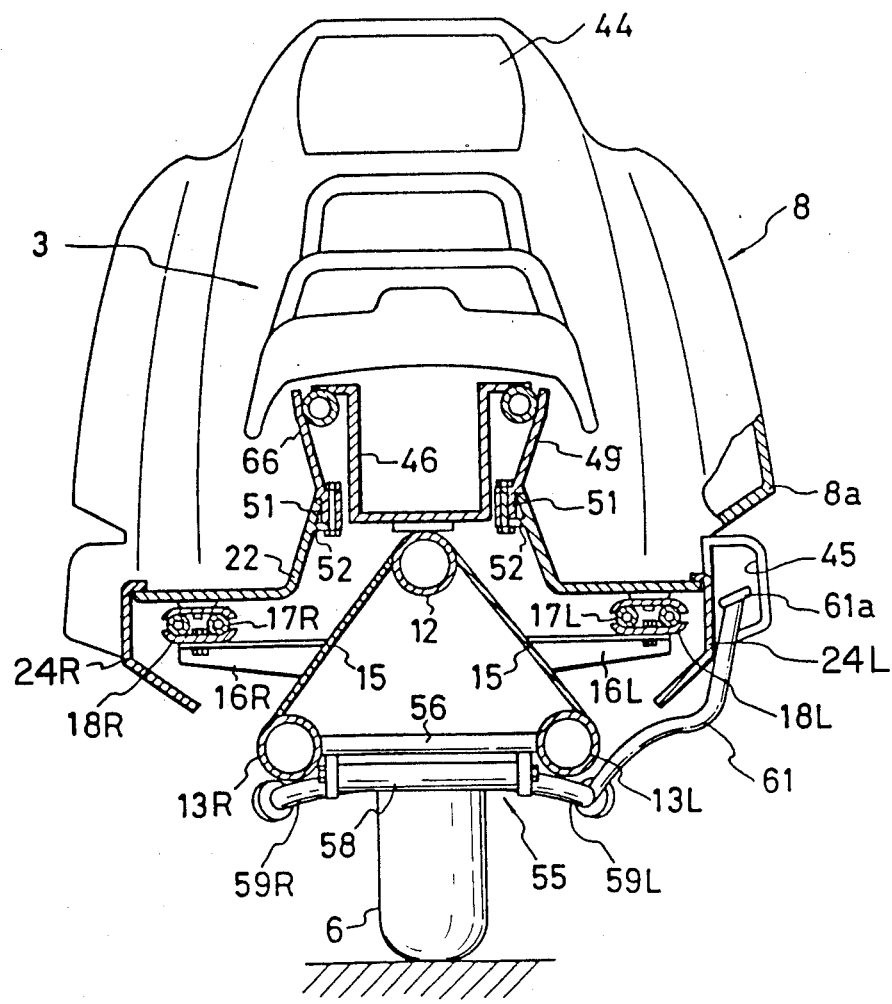
FIG. 5 is a front elevation of the rear portion of the body as cut at the central portion of the body.
Figure 6:
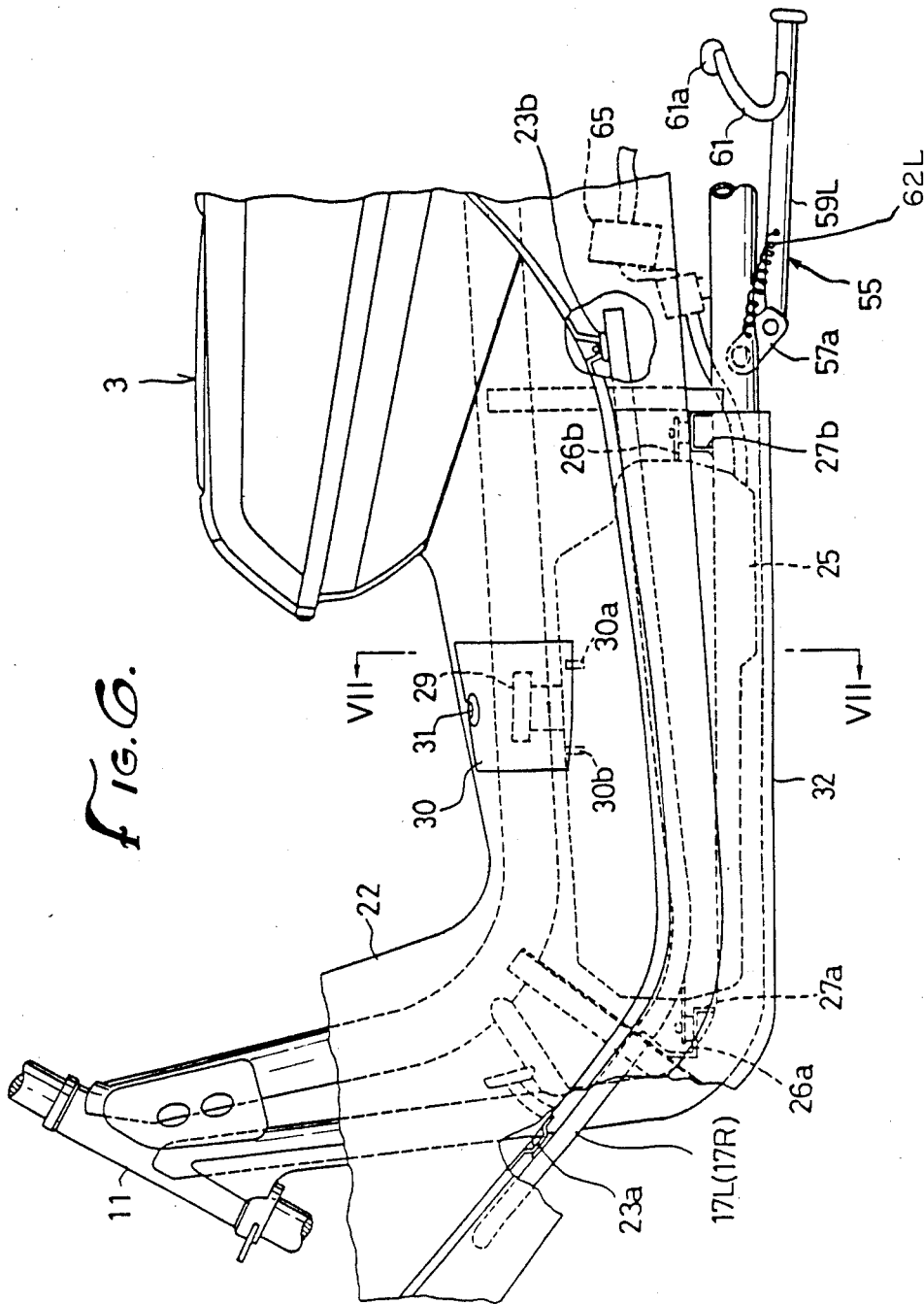
FIG. 6 is a side view of the step floor as partly broken.

As is best seen in FIG. 5, the horizontally extending portions of the main pipe 12 and the down pipes 13L and 13R are arranged in such a manner that three lines connecting the pipes 12, 13L and 13R form an isosceles triangle having a vertex at the main pipe 12, and are connected to one another by means of gusset plates 15. A pair of stays 16L and 16R each having a sectional L-shape are projected sidewardly from the gusset plates 15. Longitudinal U-shaped pipes 17L and 17R are fixed by screws or other appropriate means through mounting plates 18L and 18R to the stays 16L and 16R. As shown in FIG. 6, the longitudinal U-shaped pipes 17L and 17R extend substantially along the main pipe 12 from a lower position of the head pipe 11 to a lower position of the seat 3.

Referring to FIGS. 2 and 3, a substantially V-shaped seat pipe 19 is welded or otherwise suitably attached at its rear ends to the rear inclined portions of the down pipes 13L and 13R. The seat pipe 19 is supported at a front end portion by support pipes 20a and 20b fixed to the upright rising portions of the down pipes 13L and 13R. The V-shaped seat 3 is placed on the seat pipe 19, and is fixed thereto in such a manner that hooks 3a formed at a rear portion of the seat 3 (See FIG. 8) are engaged with engagement portions 21a and 21b formed on the seat pipe 19, and then a fixing portion 3b is bolted to a fixing portion 19a of the seat pipe 19.

As shown in FIGS. 3 and 4, the low-slung step floor 7 as previously mentioned is formed by a floor panel 22 extending along the main pipe 12 and the pair of down pipes 13L and 13R. The floor panel 22 has a convex portion 22a at a central portion where the main pipe 12 is positioned. As shown in FIG. 6, the floor panel 22 is bolted to mounting plates 23a and 23b fixed at front and rear end portions of the longitudinal U-shaped pipes 17L and 17R. Side panels 24L and 24R are provided on both side edges of the floor panel 22, and are bolted at its rear end bent portion 24a to a rear end portion of the longitudinal U-shaped pipe 17L (17R) as shown in FIG. 4.

Figure 7:
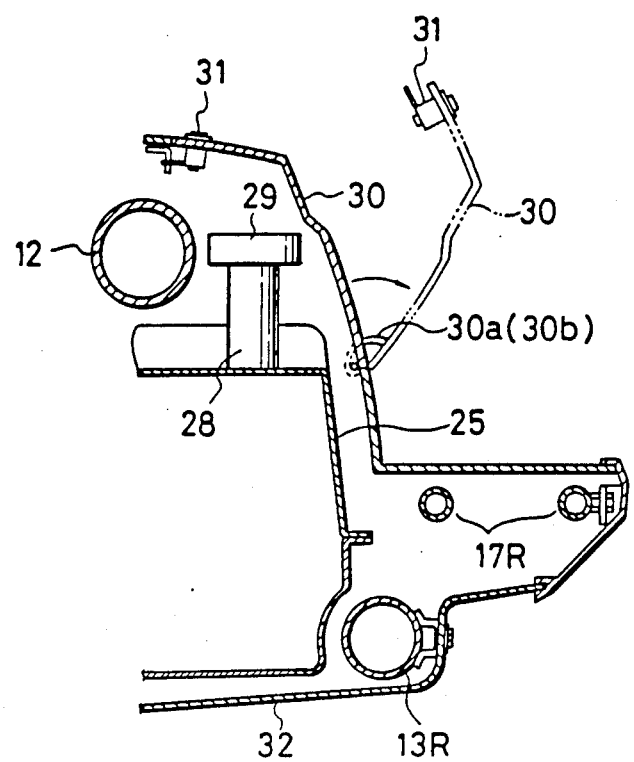
FIG. 7 is a sectional view taken along the line I—I in FIG. 6.

Referring to FIGS. 6 and 7, a fuel tank 25 is provided between both the horizontal extending portions of the down pipes 13L and 13R, and is bolted at its mounting stays 26a and 26b projected from front and rear ends thereof to mounting plates 27a and 27b fixedly provided between the pair of down pipes 13L and 13R. The fuel tank 25 may be provided with a fuel filler pipe 28 projecting from the upper surface at a right-hand position of the main pipe 12 with respect to a vehicle advancing direction. The fuel filler pipe 28 is closed by a fuel cap 29. The floor panel 22 is formed with an opening portion at an upper position of the fuel cap 29 for the purpose of supplying fuel to the fuel tank 25, with a lid 30 which is openably mounted to the opening portion by means of hinges 30a and 30b. The lid 30 is provided with a key 31 at a central position of a free end thereof. An underguard plate 32 for protecting the fuel tank 25 is provided below the fuel tank 25, and is engaged at both side edges with lower edges of the side panels 24L and 24R.

Figure 8:
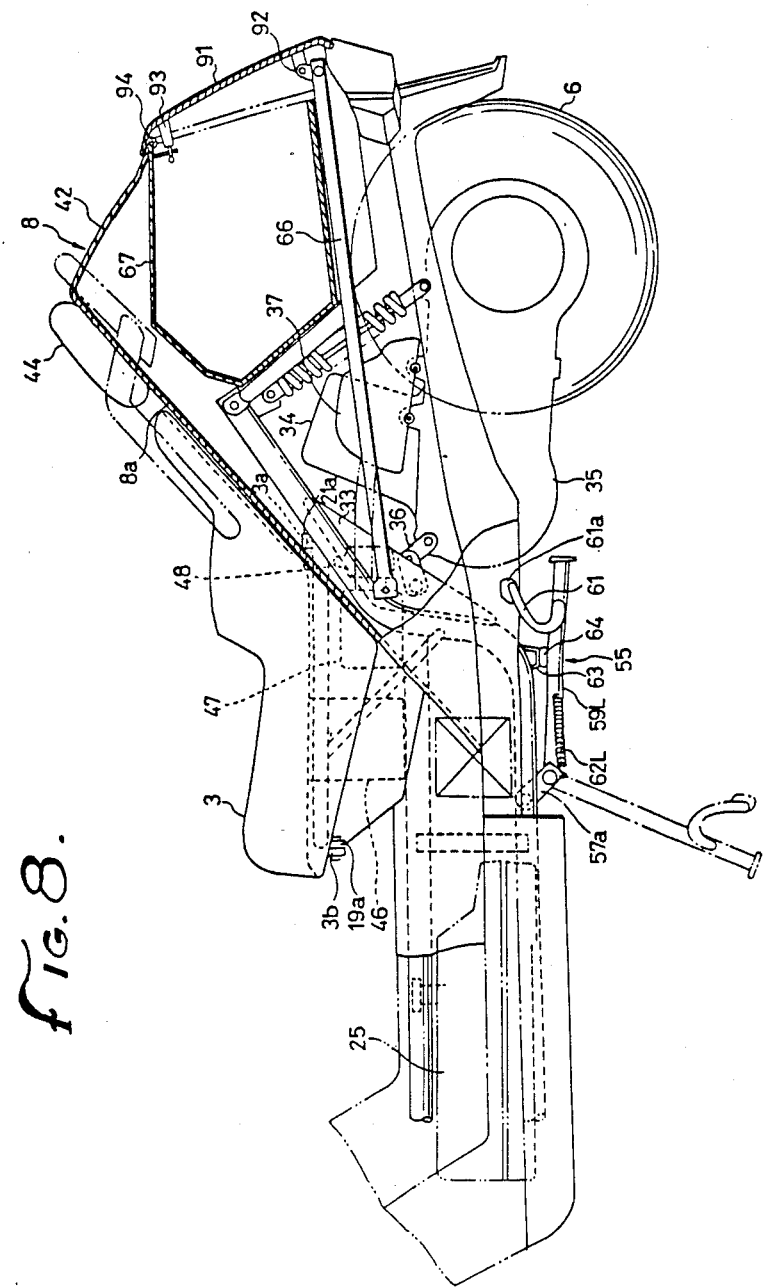
FIG. 8 is an enlarged side view of the rear portion of the body as partly in section.

Referring to FIGS. 2 and 8, triangular gusset plates 33 are welded to the rear rising portions of the pair of down pipes 13L and 13R. A power unit 35 is integrally formed with an engine to transmit power of the engine 34 to the rear wheel 6. The power unit 35 is swingably mounted at its front end through a link 36 to one of the gusset plates 33. An air cleaner case 37 is mounted on the power unit 35. The rear end portion of the power unit 35 is connected to the left side of an axle of the rear wheel 6 with respect to a vehicle advancing direction. As shown in FIG. 4, the right side of the axle is connected to a rear end portion of a support plate 38 mounted to a crank case of the engine 34 at a front end portion. A muffler 86 is provided on the outside of the support plate 38. As is apparent from FIG. 4, the rear rising portions of the down pipes 13L and 13R are divergently arranged so that a swinging portion of the air cleaner case 37 may be secured without hindering the swinging action thereof, and that a sufficient tilt angle of the down pipes 13L and 13R with respect to a vertical plane may be obtained. Further, a capacity of a rear trunk 67 which will be hereinafter described may be increased. A cross member 39 is fixedly provided between the rear end portions of the down pipes 13L and 13R, and a pair of suspensions 40L and 40R for supporting the rear wheel 6 are mounted at respective upper ends through stays 41a and 41b to the cross member 39. Provision of the cross member 39 enhances the support strength characteristic of the suspensions 40L and 40R by the down pipes 13L and 13 R.

Referring to FIGS. 3 and 8, the rear cover 8 has a projection 42 at an upper portion thereof, and the projection 42 is formed with a plurality of louvers 43 for discharging heat from the engine 34 on a rear slant surface thereof. With this arrangement, the heat from the engine 34 rises along an upper slant surface of the rear cover 8 to the projection 42, and is sucked out from the louvers 43 by the action of air flow along the rear slant surface of the projection 42 during running of the vehicle. Thus, the heat may be smoothly discharged through the louvers 43. A back rest 44 is provided on a front surface of the projection 42. Further, a partition board 8a formed of a heat insulating material is provided on the upper slant surface of the rear cover 8 inclined along the rear edge of the seat 3. The partition board 8a is preferably integrally formed with the rear cover 8 by using heat insulating resin. The provision of the heat insulating partition board 8a on the rear slant surface of the rear cover 8 impedes the flow of heat from the engine 34 from being transmitted to the seat 3 to thereby protect the seat 3 from the heat, resulting in longer life for the seat 3.

The rear cover 8 is comprised of an upper cover 8A for covering a peripheral portion of the engine 34 and an upper portion of the rear wheel 6 and a lower cover 8B for covering the power unit 35, wherein the lower cover 8B may be separated from the upper cover 8A. With this arrangement, during repair or maintenance of the power unit 35, for example, it is not necessary to completely remove the rear cover 8 from the body, but it is sufficient to remove the lower cover 8B only, thus improving workability during maintenance. The lower cover 8B is formed with an air inlet 45 opening to the front side for inducing air into the body during running. As shown in FIG. 4, the lower cover 8B is provided with a boss 53 on the inside of a front end portion, and the boss 53 is engaged with a mounting hole 54 formed at the rear end portion of the longitudinal U-shaped pipe 17L.

Under the seat 3 are arranged a battery case 46, a chamber 47 supplied with air from the air cleaner case 37 on the power unit 35 through a tube (not shown), and a carburetor 49 communicating with the chamber 47. These members are surrounded by a lower seat cover 49. As is apparent from FIG. 3, the convex portion 22a of the floor panel 22 is obliquely cut at a rear end portion, and the lower seat cover 49 is engaged with such an obliquely cut portion of the convex portion 22a at a lower end thereof, thereby providing continuation to the floor panel 22 and enhancing appearance of integral construction of the body cover. Further, since the lower seat cover 49 is connected with the floor panel 22 at a position higher than the floor surface of the floor panel 22, there is little possibility that sand and mud, etc. on the floor surface may enter the juncture between the lower seat cover 49 and the floor panel 22 into the body. The lower seat cover 49 is formed with a plurality of positioning members 50 and a plurality of fixing members 51 at a lower end thereof. As shown in FIG. 5, the fixing members 51 are bolted to a plurality of fixing members 52 inwardly projecting from the obliquely cut portion of the projection 22a.

Referring to FIGS. 4, 6 and 8, a main stand 55 is located under the seat 3 between the underguard plate 32 and the power unit 35. As is apparent from FIG. 4, the main stand 55 includes a rotating shaft 58 rotatably mounted through stays 57a and 57b to a cross member 56 fixed between the pair of down pipes 13L and 13R, a pair of legs 59L and 59R fixed to the rotating shaft 58, and a cross member 60 fixed between the pair of legs 59L and 59R. As shown in FIG. 8, the main stand 55 is adapted to swing between a using position denoted by a dashed line and a retracted (unused) position denoted by a solid line. A return spring 62L is provided under tension between the leg 59L and the stay 57a. A stopper 63 abutting against the main stand 55 in the retracted position is provided in the vicinity of the rear rising portions of the down pipes 13L and 13R. A rubber member 64 serving as a cushion material is attached to the abutment surface of the stopper 63. The main stand 55 located between the underguard plate 32 and the power unit 35 also serves as a protection member for protecting an auxiliary machinery such as a fuel pump 65 located above the main stand 55, the engine 34 and the frame pipes.

The main stand 55 includes an arm 61 projecting outwardly from the leg 59L, and the arm 61 is provided with a pedal 61a at a free end thereof. As shown in FIGS. 3 to 5, when the main stand 55 is in the retracted position, the pedal 61a is positioned on a front side of the air inlet 45 and on the inside of an outer edge of a projecting portion 8b of the rear cover 8. With this arrangement, as the pedal 61a of the arm 61 is retracted at a position below the projecting portion 8b of the rear cover 8 under the retracted condition of the main stand 55, the pedal 61a does not obstruct a rider. In standing the main stand 55, a foot F is stepped to the position below the projecting portion 8b of the rear cover 8, and is mounted on the pedal 61a. Therefore, there is no interference in using the main stand 55.

Figure 9:
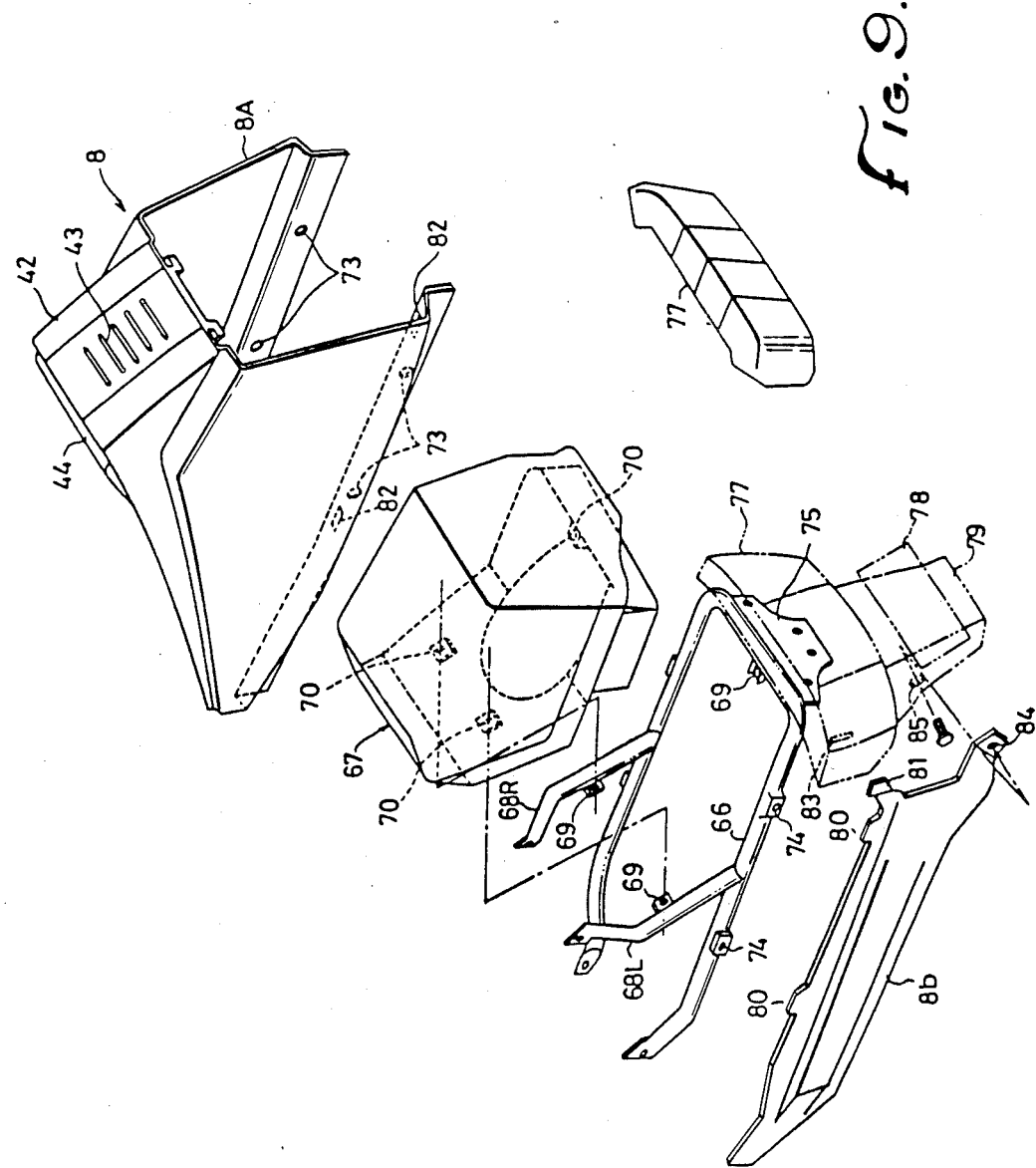
FIG. 9 is an exploded perspective view of the rear portion of the body.

Referring to FIGS. 2 and 8, a trunk frame 66 extends from the gusset plates 33 welded to the rear rising portions of the down pipes 13L and 13R, and a rear trunk 67 is mounted on the trunk frame 66. As is apparent from FIG. 9, the trunk frame 66 having a substantially U-shaped structure is fixed to the gusset plates 33 at front ends thereof, and is also fixed through support pipes 68L and 68R welded at intermediate portions to the down pipes 13L and 13R. Three fixing members 69 for example are welded to the frame 66 and the support pipes 68L and 68R, and are bolted to three mounting holes 70 provided at a bottom portion of the rear trunk 67.

Figure 10:
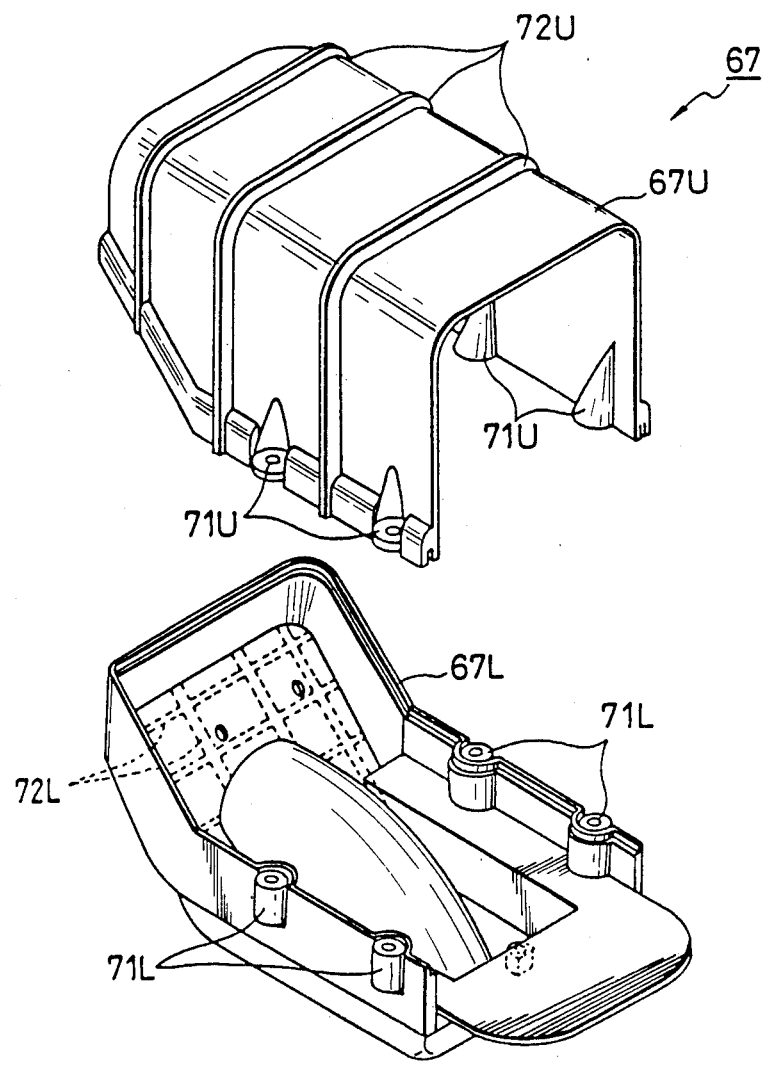
FIG. 10 is an exploded perspective view of the rear trunk.

Referring to FIG. 10, the rear trunk 67 is comprised of an upper case 67U and a lower case 67L. The upper and lower cases 67U and 67L are engaged at respective opening ends, and are formed into an integral structure to define a trunk compartment. A plurality of fixing portions 71U and 71L formed at peripheral edges of the upper and lower cases 67U and 67L are fixed by screws. The upper case 67U is integrally formed with a plurality of lateral ribs 72U along the outer surface thereof, and the lower case 67L is integrally formed with a plurality of longitudinal and lateral ribs 72L on a bottom surface thereof, thereby improving rigidity of the rear trunk 67.

Referring again to FIG. 9, the rear trunk 67 mounted on the trunk frame 66 is surrounded by the upper cover 8A of the rear cover 8. The upper cover 8A has a plurality of mounting holes 73 at a lower end portion thereof at which holes 73 a plurality of nuts 74 welded to the trunk frame 66 are bolted, thus fixing the upper cover 8A to the body. A tail light assembly 76 is mounted to a stay 75 welded to a rear end portion of the trunk frame 66. The tail light assembly 76 includes a tail light 77 and a guard 79 for mounting a license plate 78 thereon. The lower cover 8B of the rear cover 8 has two upper projections 80 and an upper rear projection 81, which are engaged with holes 82 formed through the upper cover 8A and a hole 83 formed through the number guard 79, respectively. Then, the lower cover 8B is bolted at a rear end hole 84 to the mounting hole 85 formed through the number guard 79. The front end portion of the lower cover 8B is engaged with the body frame by means of the boss 53 as previously mentioned with reference to FIG. 4.

Referring to FIG. 8, the rear trunk 67 is enclosed within the rear cover 8, and opens to the rear side of the body. An opening edge of the rear trunk 67 is slightly projected from the rear end of the body (rear cover 8). A lid 91 for closing the opening of the rear trunk 67 is swingably mounted to the trunk frame 66 by means of hinges 92 at a lower end thereof. The lid 91 is provided with a key 93 at a central position of an upper end portion. A seal member 94 is mounted at the opening edge of the rear trunk 67, and is adapted to abut against the lid 91 under the closed condition, thereby improving waterproofing performance of the rear trunk 67. Furthermore, as is apparent from FIG. 13, a groove 96 is defined by the rear edge of the upper cover 8A, the rear trunk 67 and the seal member 94. The groove 96 acts as a guide groove for drainage of rainwater.

As shown in FIG. 4, the rear cover 8 is wider than the step floor 7. An outer wall of the rear trunk 67 received in the rear cover 8 is arranged adjacent to an inner surface of the rear cover 8. With this arrangement, a capacity of the trunk room of the rear trunk 67 may be increased, and the rear trunk 67 may be utilized as a reinforcing member for the rear cover 8, thereby improving rigidity of the rear cover 8 without using any dedicated reinforcing members.

Figure 11:
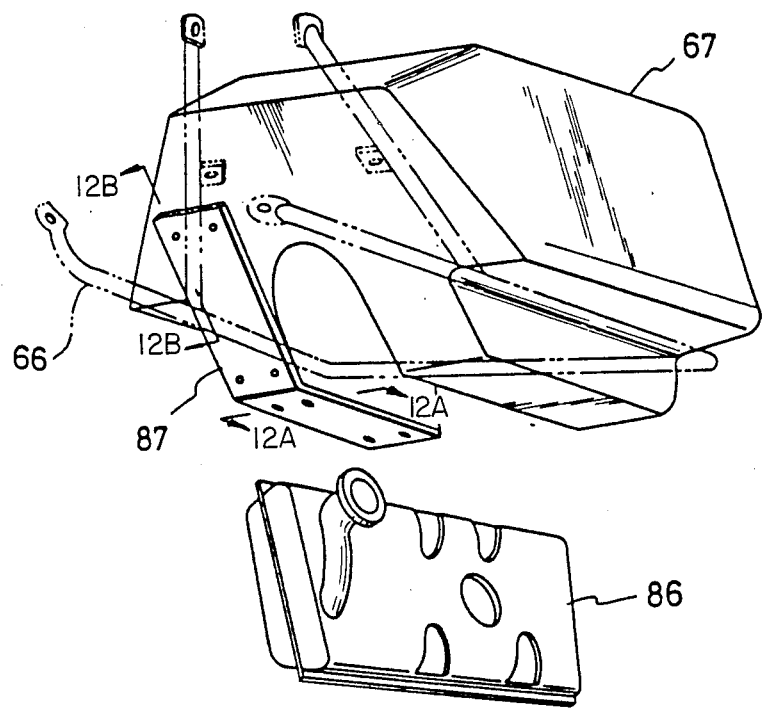
FIG. 11 is a perspective view showing the positional relation between the rear trunk and the muffler as seen from the obliquely down side.

Referring to FIG. 11, a muffler 86 is located below and on a right-hand side of the rear trunk 67 with respect to a vehicle advancing direction. A heat insulating material 87 is mounted to a bottom plate of the trunk over the muffler 86, so as to insulate heat from the muffler 86. As shown in FIGS. 12A and 12B, the heat insulating material 87 is formed of glass wool 88 preferably covered by silver paper, for example, and is fixed to the bottom plate of the trunk by caulking with rivets 90. The heat insulating material 87 serves to insulate the heat from the muffler 86 and protect the bottom plate of the trunk. Further, there is formed an air layer 95 between the heat insulating material 87 and the bottom plate of the trunk by the provision of the ribs 72L, thereby further improving a heat insulating effect.

In the aforementioned embodiment, the step floor 7, the rear cover 8, the floor panel 22 and the rear trunk 67 are made of resin, while the frame members consisting of the main pipe 12, the downpipes 13L and 13R, the seat pipe 19 and the trunk frame 66 are made of metal.

Figure 14:
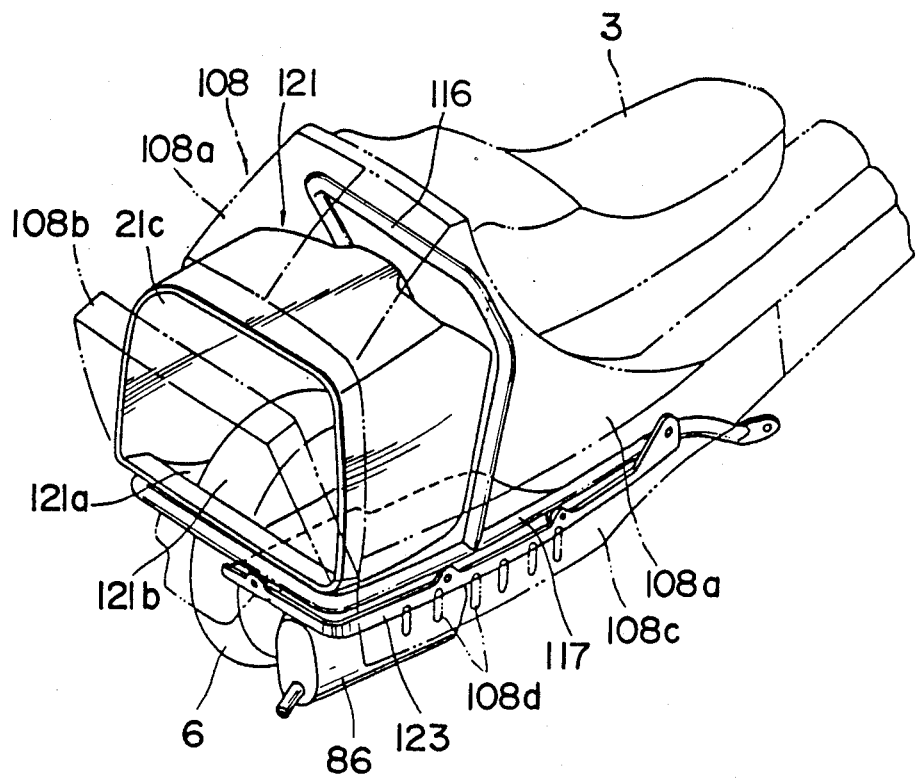
FIG. 14 is a perspective view of the rear body.
Figure 15:
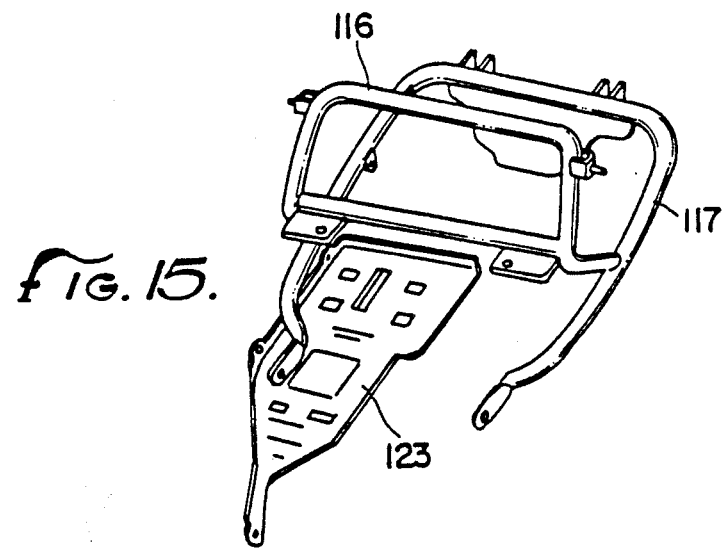
FIG. 15 is a perspective view showing a trunk frame and a heat shield.
Figure 16:
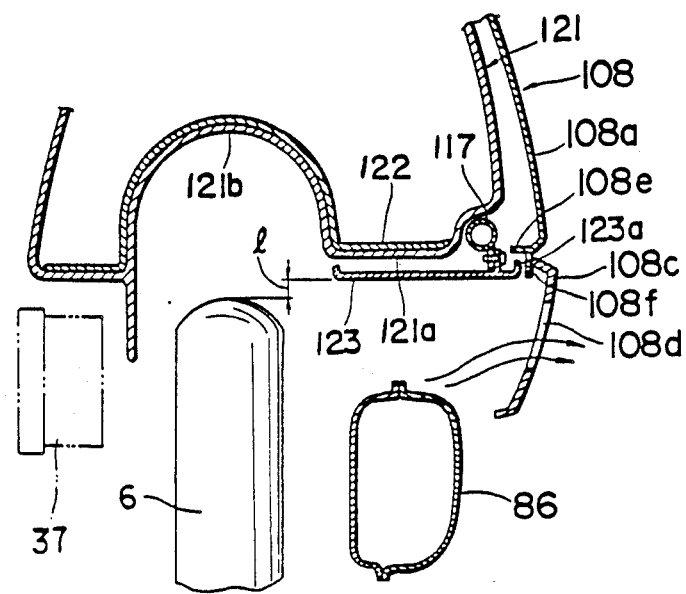
FIG. 16 is a sectional view from the rear showing the positional relationship between the heat shield, trunk and muffler.

FIGS. 14, 15 and 16 illustrate an alternate trunk design according to the present invention. A trunk frame 117 of substantially U-shaped is attached to the down pipe (attachment not shown but substantially similar to attachment of trunk frame 66 in FIGS. 2 and 8) and reinforced by a cross member 116 projecting upwardly. The trunk frame 117 is also fixedly connected to the rear body 108 at the rear of the vehicle body. A pair of left and right side covers 108a, 108b are mounted on the trunk frame 117 to comprise the rear body 108. A rear cover 108b forms a lid of an inner trunk mentioned hereinafter, and underside covers 108c are disposed to the lower portions of the side covers 108a, 108a.

At the left side of the vehicle body of the rear wheel 6 is arranged an air cleaner 37, and at the right side of the vehicle body is arranged a muffler 86 lying to the rear of the exhaust pipe (not shown). A plurality of slits 108d are provided in the underside cover 108c on the side of the muffler 86 for discharging the heat from the muffler 86 outside of the rear body 108.

A rear fender 121b is formed about rear wheel 6 keeping proper clearance therebetween. The rear fender 121b projects up into the bottom 121a of trunk 121 becoming a central portion thereof. A cushion material 122 is laid over the rear fender 121b and the bottom 121a of trunk 121. A rear door 108b is fitted within the rear opening 121c of trunk 121 and is capable of opening and closing the opening 121c at the rear of the vehicle body.

A heat shield 123 is positioned between the bottom 121a of the inner trunk 121 and the muffler 86 supported by the down pipe 13R (shown in FIG. 7) and by the trunk frame 117. The heat shield 123 is comprised of treated steel sheet or synthetic resin plate and includes an upturned side edge 123a on the outside the vehicle body forming a baffle with the horizontal rib 108e from the lower end of the side cover 108a and the vertical rib 108f. The heat shield 123, by its position, deflects the heat from the muffler 86 and exhausts the heat out through the slits 108d of the underside cover 108c thereby preventing heat transfer to the bottom 121a of the inner trunk 121 and protecting any object stored in the trunk 121.

FIG. 16 shows the vehicle body in a standing condition supported by its main stand (the main stand 55 is illustrated in FIG. 1). In the standing condition, the rear wheel 6 hangs down, whereby a gap —1— is set between the upper end of the rear wheel 6 and the heat shield 123.

To remove the rear wheel 6, the underside cover 108c of and the muffler 20 are first removed. However, since the heat shield 123 is located to include the gap —1— at the upper end of the rear wheel 6, it is possible to change the tire with the heat shield 123 in place. The bottom 121a of the inner trunk 121 remains protected by the heat shield 123 during tire changing.

Therefore, according to the present embodiment, since the heat transfer to the inner trunk 121 is prevented by deflecting the heat of the muffler 86 by means of the heat shield 123, the bottom 121a of the inner trunk 121 may be closely disposed to both the rear wheel 6 and the muffler 86 thereby allowing increase in trunk volume.

Thus disclosed is a body cover for a motor scooter which discharges heat from the engine unit and exhaust system. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motor scooter comprising:
    a frame;
    a front and rear wheel rotatably mounted to said frame;
    a seat connected to said frame;
    an engine unit arranged below said seat;
    a body cover comprising a rear cover enclosing said engine, and extending beyond said seat, said rear cover having a projection portion at a portion no lower than said seat, said projection portion having louvers in the wall thereof defining an outlet for discharging heat from said engine unit; and
    insulating means between said seat and said engine unit including a heat insulating partition board positioned beneath said seat and having an inclination to direct the flow of heated gases toward said projection portion.

2. The motor scooter according to claim 1 further comprising:
    a muffler positioned under said rear cover; and
    insulation means between said rear cover and said muffler.

3. The motor scooter according to claim 2 in which said insulation means is formed to direct the flow of heated gases toward said projection portion to allow for discharge of heat through the outlet therein.

4. The motor scooter according to claim 2 wherein said muffler is adjacently positioned to one side of said rear wheel, said rear cover further comprising an underside cover located adjacent to said muffler such that said muffler is between said rear wheel and said underside cover, and wherein said underside cover includes an outlet to allow for discharge therethrough of heat from said muffler.

5. The motor scooter according to claim 1 further comprising a trunk behind said seat and spaced from said rear cover, said trunk having exterior surfaces for directing the flow of heated gases toward said projection portion.

6. The motor scooter according to claim 5 further comprising:
    a muffler positioned under said rear cover; and
    insulation means between said muffler and said trunk.

7. The motor scooter according to claim 6 wherein said insulation means comprises a heat shield.

8. The motor scooter according to claim 7 wherein said heat shield is positioned over said muffler to deflect heat from said muffler away from said rear cover.

9. The motor scooter according to claim 1 in which said heat insulating partition board extends upwardly from said seat, and a back rest mounted on the exterior surface of said partition board.

* * * * *

UNITED STATES PATENT AND TRADEMARK OFFICE
CERTIFICATE OF CORRECTION

PATENT NO. : 4,800,980
DATED : January 31, 1989
INVENTOR(S) : HIDEO OCHIAI et al.

It is certified that error appears in the above-identified patent and that said Letters Patent is hereby corrected as shown below:

On the cover sheet, please correct the name of the first inventor to read as follows:

-- Hideo Ochiai --.

In claim 1 (Col. 8, l. 14), delete "portion" (second occurrence) and insert therefor -- position --.

Signed and Sealed this

Thirty-first Day of October, 1989

Attest:

DONALD J. QUIGG

*Attesting Officer*  *Commissioner of Patents and Trademarks*